US012612270B2

(12) United States Patent
Boerret

(10) Patent No.: US 12,612,270 B2
(45) Date of Patent: Apr. 28, 2026

(54) HANDLING DEVICE FOR PHARMACEUTICAL CONTAINERS, AND PROCESSING SYSTEM FOR PHARMACEUTICAL CONTAINERS COMPRISING A HANDLING DEVICE

(71) Applicant: Bausch + Ströbel SE + Co. KG, Ilshofen (DE)

(72) Inventor: Florian Boerret, Gaildorf (DE)

(73) Assignee: Bausch + Stroebel SE + Co. KG, Ilshofen (DE)

( * ) Notice: Subject to any disclaimer, the term of this patent is extended or adjusted under 35 U.S.C. 154(b) by 178 days.

(21) Appl. No.: 18/339,446

(22) Filed: Jun. 22, 2023

(65) Prior Publication Data

US 2023/0406553 A1 Dec. 21, 2023

Related U.S. Application Data

(63) Continuation of application No. PCT/EP2021/087258, filed on Dec. 22, 2021.

(30) Foreign Application Priority Data

Dec. 23, 2020 (DE) ..................... 10 2020 134 783.9

(51) Int. Cl.
*B65G 54/02* (2006.01)
*B65B 3/00* (2006.01)
(Continued)

(52) U.S. Cl.
CPC .............. *B65G 54/02* (2013.01); *B65B 3/003* (2013.01); *B65G 47/28* (2013.01); *B65G 47/842* (2013.01); *B65G 47/912* (2013.01); *B65G 47/918* (2013.01)

(58) Field of Classification Search
CPC ...... B65B 3/003; B65G 47/28; B65G 47/842; B65G 47/912; B65G 47/918; B65G 47/91; B65G 47/90; B65G 54/02
See application file for complete search history.

(56) References Cited

U.S. PATENT DOCUMENTS 3,753,589 A * 8/1973 Hahn ...................... B65B 21/20
                                                    53/247
4,832,180 A * 5/1989 Ferrero ................... B65B 35/38
                                                    294/87.1
(Continued)

FOREIGN PATENT DOCUMENTS

CN 102470933 B 10/2013
CN 104282606 A 1/2015
(Continued)

OTHER PUBLICATIONS

Search Report received in International Application No. PCT/EP2021/087258 dated Jul. 1, 2022, with transmittal, 8 pages.

*Primary Examiner* — Nicolas A Arnett
(74) *Attorney, Agent, or Firm* — Christopher A. Rothe; CM Law

(57) ABSTRACT

A handling apparatus and a processing system for pharmaceutical containers, for example vials, syringes, carpules or ampules. The handling apparatus includes two or more holding elements via which a container can be gripped in each case and of which at least one holding element can be selectively moved back and forth along a movement direction, and a spacing changing device for transferring the holding elements from a first relative position into a second relative position, and vice versa, in which the holding elements have a spacing from one another which differs from the spacing in the first relative position.

23 Claims, 8 Drawing Sheets

(51) Int. Cl.

| | | |
|---|---|---|
| *B65G 47/28* | (2006.01) | |
| *B65G 47/86* | (2006.01) | |
| *B65G 47/91* | (2006.01) | |

(56) References Cited

U.S. PATENT DOCUMENTS

| | | | | |
|---|---|---|---|---|
| 5,273,152 A * | 12/1993 | Brun | .................... | B65G 47/907 |
| | | | | 425/534 |
| 6,439,631 B1 * | 8/2002 | Kress | .................. | B65G 47/918 |
| | | | | 414/754 |
| 7,390,040 B2 * | 6/2008 | Subotincic | .......... | B25J 15/0616 |
| | | | | 414/737 |
| 7,540,369 B2 * | 6/2009 | Momich | .............. | B65G 47/848 |
| | | | | 53/244 |
| 8,353,547 B2 * | 1/2013 | Maffeis | ................ | B25J 15/0052 |
| | | | | 294/87.1 |
| 9,073,222 B2 * | 7/2015 | Crosby | .................... | B65B 5/08 |
| 2007/0018468 A1 * | 1/2007 | Behringer | ........... | B65G 47/918 |
| | | | | 294/87.1 |
| 2012/0090268 A1 | 4/2012 | Krauss et al. | | |
| 2018/0186481 A1 | 7/2018 | Franke et al. | | |
| 2018/0229866 A1 * | 8/2018 | Eberhardt | ............ | B65B 65/003 |
| 2020/0324979 A1 * | 10/2020 | Ronchi | ................. | B25J 9/1697 |

FOREIGN PATENT DOCUMENTS

| | | | |
|---|---|---|---|
| CN | 105540260 A | 5/2016 | |
| CN | 208327368 U | 1/2019 | |
| CN | 110436191 A | 11/2019 | |
| DE | 102004003188 A1 | 8/2005 | |
| DE | 102004003189 A1 | 8/2005 | |
| DE | 102010025392 A1 | 12/2011 | |
| EP | 0239547 A1 | 9/1987 | |

* cited by examiner

HANDLING DEVICE FOR PHARMACEUTICAL CONTAINERS, AND PROCESSING SYSTEM FOR PHARMACEUTICAL CONTAINERS COMPRISING A HANDLING DEVICE

CROSS-REFERENCE TO RELATED APPLICATIONS

This application is a continuation patent application of international application number PCT/EP2021/087258, filed on Dec. 22, 2021, and claims the benefit of German application number 10 2020 134 783.9, filed Dec. 23, 2020. The contents of international application number PCT/EP2021/087258 and German application number 10 2020 134 783.9 are incorporated herein by reference in their entireties and for all purposes.

FIELD

The present disclosure relates to a handling apparatus for pharmaceutical containers, for example vials, syringes, carpules or ampules, in particular for use in a processing system for pharmaceutical containers.

Furthermore, the present disclosure relates to a processing system for pharmaceutical containers, for example vials, syringes, carpules or ampules, with such a handling apparatus.

BACKGROUND

In a processing system for pharmaceutical containers (also referred to as "vessels" or "objects"), a handling apparatus, for example of the type mentioned above, is used. In this case, the handling apparatus comprises two or more holding elements via which a respective container can be gripped. The containers can be transferred, for example, to a transport device. Different stations for processing the containers can be provided along the transport device. Conceivable is, for example, a filling station for filling a pharmaceutical substance into the containers, at least one weighing station for controlling the degree of filling, and/or at least one closing station for closing a container opening. For example, a marking station for applying a label to the filled and closed containers is conceivable. The pharmaceutical substance can in particular be a medically active substance (agent).

For transfer to the transport device, the containers can be removed, for example, from a pharmaceutical packaging means which is a common carrier for the containers. Such a packaging means can, for example, be referred to as a nest in which the containers are received in a matrix-like manner. Another example of such a packaging means is a so-called tray in which, in particular, syringes are received laterally next to one another.

As mentioned, the containers to be processed can comprise, for example, vials, syringes, carpules or ampules. Vials may also be referred to as "bottles" or "phials." In practice, it is known that containers of different types (for example, vials) and, if the type is identical, of a different nature, in particular of a different size, exist.

An object underlying the present disclosure is to provide a handling apparatus and a processing system for pharmaceutical containers which can be used in a versatile manner.

SUMMARY

In a first aspect of the present disclosure, a handling apparatus for pharmaceutical containers, for example vials, syringes, carpules or ampules is provided. The apparatus comprises two or more holding elements via which a container can be gripped in each case and of which at least one holding element can selectively be moved back and forth along a movement direction, and a spacing changing device for transferring the holding elements from a first relative position into a second relative position, and vice versa, in which the holding elements have a spacing from one another which differs from the spacing in the first relative position.

In a second aspect, the present disclosure relates to a processing system for pharmaceutical containers. The processing system comprises at least one handling apparatus in accordance with the first aspect and an adjusting device on which the handling apparatus is held or which comprises the handling apparatus. The adjusting device is designed to transfer the handling apparatus from a receiving position into a transfer position, and vice versa. In the receiving position, the containers can be received from a first receiving unit of the processing system by means of the holding elements assuming the first relative position, and in the transfer position, the containers can be transferred to a second receiving unit of the processing system with the holding elements assuming the second relative position.

BRIEF DESCRIPTION OF THE DRAWINGS

The foregoing summary and the following description may be better understood in conjunction with the drawing figures, of which.

DETAILED DESCRIPTION

Figures 1, 2:
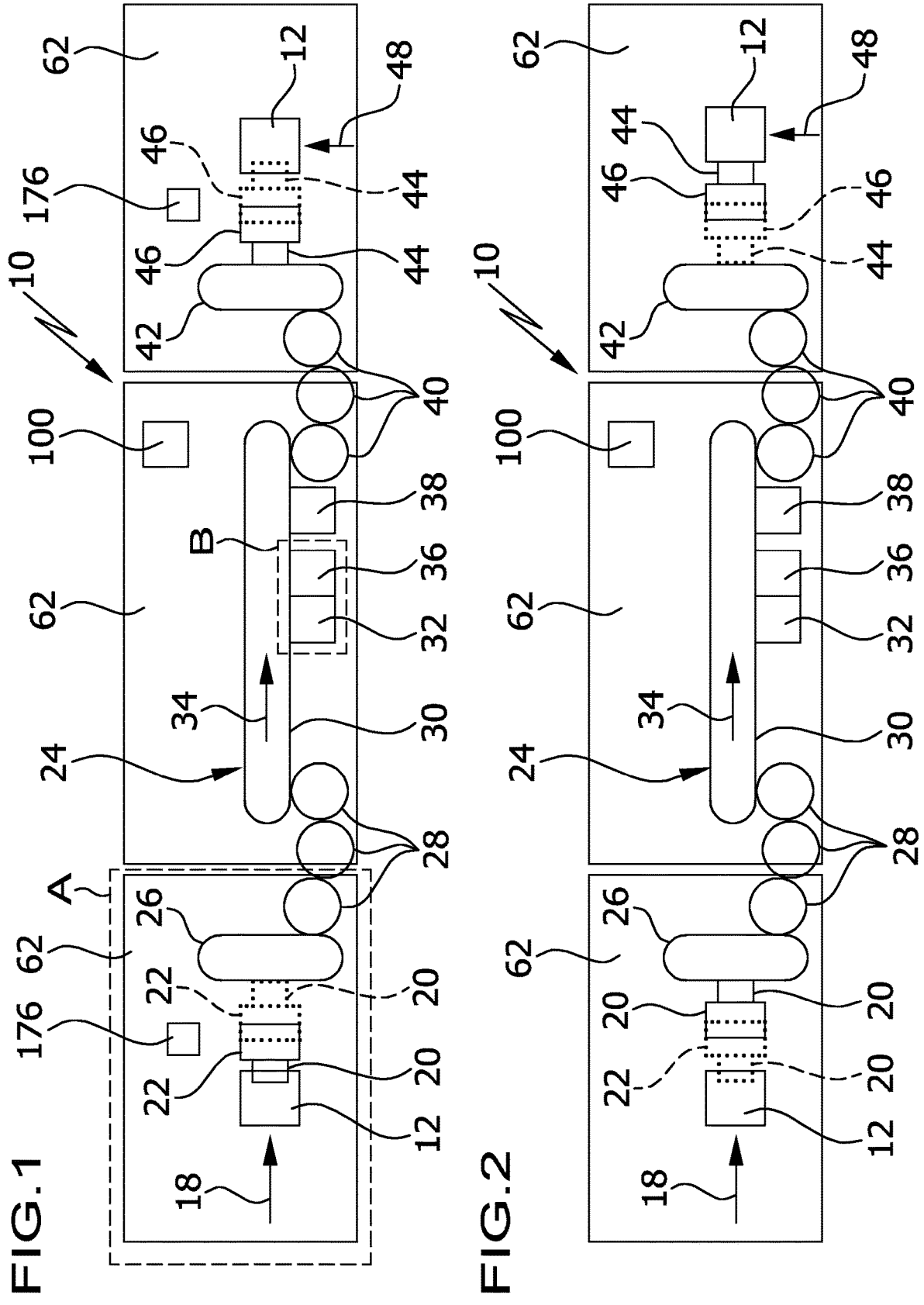
FIG. 1 is a schematic representation of a processing system in accordance with the present disclosure in a plan view.
FIG. 2 is a representation corresponding to FIG. 1, which shows the processing system at a later time.

Although the present disclosure is illustrated and described herein with reference to specific embodiments, the present disclosure is not intended to be limited to the details shown. Rather, various modifications may be made in the details within the scope and range of equivalents and without departing from the present disclosure.

The present disclosure relates to a handling apparatus for pharmaceutical containers, for example vials, syringes, carpules or ampules, comprising two or more holding elements via which a container is grippable in each case and of which at least one holding element is selectively movable back and forth along a movement direction; and a spacing changing device for transferring the holding elements from a first relative position into a second relative position, and vice versa, in which the holding elements have a spacing from one another that differs from the spacing in the first relative position.

In the handling apparatus in accordance with the present disclosure, at least two holding elements are provided which are each designed for gripping a container so that the container can be gripped. Of these holding elements, at least one holding element can be moved back or forth in the movement direction, wherein the movement can take place, for example, relative to a support device of the handling apparatus. By means of the spacing changing device, the spacing of the holding elements from one another along the movement direction can be changed. In the first relative position, the spacing of the holding elements from one another is different from the spacing of the holding elements in the second relative position. This makes it possible to grip containers by means of the handling apparatus, which containers can have different spacings from one another depending on the manner of feeding. This spacing of the containers, also referred to by a person skilled in the art as a "pitch," can depend, for example, on the common carrier receiving the containers and can be of different sizes when the carriers are different. By means of the handling apparatus, the spacing of the containers from one another, in particular for transfer to a transport device, can be changed to a different spacing when the holding elements are transferred from the first relative position into the second relative position. This makes it possible to adapt the original spacing of the containers from one another to the spacing required for the transport device, the "pitch," so to speak, of the transport device. The handling apparatus therefore has a high versatility. It is also conceivable, for example, to remove the containers via the handling apparatus from the transport device and to feed them back to a common carrier, wherein the pitch of the transport device differs from the pitch of the receiving carrier.

A change in the spacing of the containers from one another by means of the handling apparatus can be referred to in particular as a "pitch adaptation."

It can be provided, for example, that the spacing of the holding elements from one another is smaller in the first relative position than in the second relative position. Alternatively, the spacing can be greater in the first relative position than in the second relative position.

The holding elements are, in particular, spread relative to one another during transfer from the first relative position into the second relative position and, conversely, are brought closer to one another during transfer into the first relative position, or vice versa.

It can be advantageous if the at least one movable holding element can be moved back and forth in a straight line along the movement direction. In particular, a linear movement of the holding element can be provided. The movement of the at least one holding element can be guided, for example, by means of a guide device.

The holding elements can preferably be arranged laterally next to one another, in particular arranged and oriented in parallel to one another, along the movement direction.

It is favorable for the handling apparatus to comprise more than two holding elements which are arranged laterally next to one another along the movement direction and which can be transferred by means of the spacing changing device from a first relative position into a second relative position, and vice versa, in which the spacing of adjacent holding elements from one another is different from the spacing in the first relative position. Accordingly, the handling apparatus can preferably comprise more than two holding elements. This makes it possible to grip more than two containers. Exemplary embodiments may comprise four to twelve or even more holding elements. It is in particular favorable if the number of holding elements corresponds to the number of containers arranged next to one another in a row in a common carrier (for example, a nest) so that each container is assigned one holding element. By transferring the two or more holding elements from the first into the second relative position, a respective spacing of adjacent holding elements can be changed. This can serve in particular to adapt the original pitch of the containers, for example in the carrier, to a different pitch, for example of the transport device.

The number of holding elements can be even-numbered or odd-numbered.

It is in particular favorable if a respective spacing of adjacent holding elements is increased or reduced by transferring from the first relative position into the second relative position.

Preferably, the holding elements are arranged equidistantly from one another in the first relative position and/or in the second relative position.

It may be advantageous if the holding elements can be moved relative to one another synchronously and/or simultaneously by means of the spacing changing device.

It may be favorable if one of the holding elements is fixed in place on a support device of the handling apparatus. The relevant holding element can form a fixed point on the support device, relative to which at least one additional holding element can be moved by means of the spacing changing device for transferring from the first relative position into the second relative position, and vice versa. The fixed holding element is in particular not moved by the spacing changing device.

The support device has already been discussed above. The support device can, for example, comprise or form a frame of the handling apparatus to which its other components may be fixed. As an alternative or in addition to the frame, a housing of the support device or a housing as the support device may be provided. For example, a drive unit of the spacing changing device and/or a guide device for the holding elements can be fixed to the support device. The support device can in particular be held on an adjusting device for a translatory movement and/or a pivot device via which the handling apparatus can be moved within the processing system. This is discussed below.

It may be advantageous if the spacing of the holding elements from one another along the movement direction can be discretely or continuously adjusted and/or preset by changing the spacing. For example, the spacing changing device can be controllable for this purpose.

In particular, a displacement path of the holding elements along the movement direction can be adjustable.

It is advantageous if the handling apparatus comprises a guide device with at least one guide element on which a holding element is guided along the movement direction and is in particular displaceably guided along the movement direction. In this way, a reliable function of the handling apparatus can be ensured. The holding element can interact directly or indirectly with the at least one guide element and be guided thereon.

Preferably, at least one bearing element is provided on which the at least one guided holding element is fixed and which is in engagement with the guide element. The bearing element can form a ball bearing or roller bearing, for example.

In a preferred embodiment of the present disclosure, the at least one guide element is or comprises a guide rail. In particular, the at least one movable holding element can be displaced along the guide rail by means of the spacing changing device.

The guide device preferably comprises two guide elements arranged spaced from one another, wherein in the case of more than two holding elements, a part of the holding elements is guided on a guide element and another part of the holding elements is guided on the additional guide element, and wherein adjacent holding elements are guided on different guide elements. It has, for example, been shown in practice that a compact design can be achieved in this way in addition to a reliable function of the handling apparatus. The compact design proves advantageous, for example, in being able to process containers that have relatively close spacings from one another and yet can be gripped by the holding elements when they are in the closer position (for example, the first relative position).

It can be provided, for example, that for displacing a holding element, a thrust member of a drive unit of the spacing changing device engages in an intermediate space between two guide elements arranged spaced from one another. This makes it possible to achieve a compact design of the handling apparatus.

It is favorable if the spacing changing device comprises an actuatable and/or controllable drive unit which is operatively connected to at least one holding element.

For example, the drive unit can be controlled by a control device of the handling apparatus or a control device of the processing system to transfer the holding elements from the first into the second relative position and/or vice versa.

The drive unit is preferably configured to be electric. Alternatively or additionally, a different drive unit may be provided, for example a pneumatic, hydraulic or magnetic drive unit.

In an advantageous implementation of the present disclosure, the drive unit is electrical and, for example, comprises or forms a linear drive, for example with an electromagnetically controlled thrust shaft.

Favorably, the drive unit acts directly or indirectly on only one of the holding elements, wherein preferably only one drive unit of the drive changing device is provided.

In a different preferred embodiment of the present disclosure, it may be provided that the spacing changing device comprises more than one drive unit. For example, two or more drive units are provided which are assigned to a respective holding element.

In particular when only one drive unit is provided, it proves advantageous if the handling apparatus comprises a coupling unit by which two or more holding elements are coupled to one another, wherein a movement of at least one holding element by means of the drive unit is transmitted via the coupling unit to at least one additional holding element. In this way, separate drive units for preferably all holding elements except for exactly one holding element can be saved. The coupling unit can preferably be configured mechanically which results in a structurally simple design and reliable operation of the handling apparatus.

It can prove favorable if the coupling unit comprises or forms at least one scissor joint, in particular that a scissor lattice is provided by which the two or more holding elements are connected to one another. The scissor lattice, also referred to as scissor track, is understood in the present case to mean in particular a plurality of scissor joints connected to one another. The scissor lattice can, in particular, be transferred from a pushed-together state into a pulled-out state, and vice versa, wherein the spacing of the holding elements from one another is preferably less in the pushed-together state than in the pulled-out state. Reliable functioning of the handling apparatus can be ensured by the scissor lattice.

For example, an articulation member of the scissor lattice is articulated to a respective holding element and is connected to at least one additional articulation member of the scissor lattice in an articulated manner. Two articulation members of the scissor lattice preferably intersect at a respective holding element.

In an advantageous embodiment of the present disclosure, it can be provided that the spacing changing device, for example as a component of the coupling unit, comprises a worm body with which the holding elements are directly or indirectly engaged and which can be driven, for example rotatably, by means of a drive unit of the spacing changing device. When the worm body rotates, the relative position of the holding elements can be changed, in particular the spacing thereof from one another is increased by rotation in one direction and reduced by rotation in the opposite direction.

It is advantageous if for subjecting a container to a negative pressure, a suction conduit with a suction opening is arranged on the respective holding element, wherein the suction conduit can be connected or is connected to a vacuum device. This makes it possible, for example, to grip the containers pneumatically with the holding elements. When subjected to a negative pressure, the containers can be sucked onto the holding element and held thereon. A contour of the holding element is preferably adapted to a contour of the container.

For example, the holding element comprises a recess into which the container at least partially engages, wherein the suction opening is preferably arranged at the cutout. The holding element can, for example, rest against a jacket of the container.

The vacuum device can be part of the handling apparatus or of the processing system. By activation of the vacuum device, the container can be subjected to a negative pressure and held on the holding element. By eliminating the negative pressure, the container can be detached from the holding element.

Alternatively or additionally, provision can be made for the holding elements to be transferable between a holding position and a release position by means of at least one electrical actuating unit. In the holding position, the holding elements can, for example, partially surround the container and hold it by means of a positive engagement. In the release position, the containers are released and, for example, disengaged or can be disengaged from the holding elements.

In a preferred embodiment of the present disclosure, the handling apparatus can comprise a housing in which the spacing changing device and a guide device for the holding elements are received and in which the holding elements are partially received, wherein a holding portion of a respective holding element is arranged outside the housing. The components of the handling apparatus arranged within the housing are, for example, protected from an atmosphere in which the handling apparatus is used. This is, for example, a protective atmosphere and/or an atmosphere for decontamination purposes. The holding elements can protrude from the housing. A container can be gripped with the respective holding portion.

It can be advantageous if the holding elements comprise a respective holding portion for gripping the containers and a respective support portion, wherein the holding portion can be detachably connected to the support portion. This makes it possible, for example, to replace the holding portion with a different holding portion. As a result, the handling apparatus can be adapted, for example, to a use with different containers (for example, different in terms of container type and/or container size).

The holding elements can, for example, comprise a guide portion which can be guided directly or indirectly on the aforementioned guide device.

It is favorable if the handling apparatus comprises a first format set of detachable holding portions and a second format set of detachable holding portions, wherein the format sets differ from one another by at least one container-specific property. Depending on the nature of the containers to be processed, the appropriate format set can be used. For this purpose, the holding portions thereof are connected to the support portions. When changing to different containers, a so-called format change can be carried out in which the holding portions of the respectively other format set can be used.

It can prove advantageous if the holding portions can be detached manually and without tools from the format portions. For example, magnetic force is used to hold the holding portions on the support portions. Alternatively, a different fastening can be used, for example a screw connection.

As mentioned at the outset, the present disclosure further relates to a processing system. A processing system in accordance with the present disclosure for pharmaceutical containers, which achieves the object mentioned at the outset, comprises at least one handling apparatus of the aforementioned type and an adjusting device on which the handling apparatus is held or which comprises the handling apparatus, wherein the adjusting device is designed to transfer the handling apparatus from a receiving position into a transfer position, and vice versa, wherein in the receiving position, the containers can be received from a first receiving unit of the processing system by means of the holding elements assuming the first relative position, and in the transfer position, the containers can be transferred to a second receiving unit of the processing system with the holding elements assuming the second relative position.

The advantages already mentioned in connection with the explanation of the handling apparatus in accordance with the present disclosure can also be achieved with the processing system in accordance with the present disclosure. In this regard, reference can be made to the above statements.

Advantageous embodiments of the processing system in accordance with the present disclosure result from advantageous embodiments of the handling apparatus in accordance with the present disclosure. In this regard too, reference is made to the above statements.

In the processing system in accordance with the present disclosure, the handling apparatus can be used as a component of the adjusting device or held thereon in order to transfer containers from the first receiving unit to the second receiving unit. In particular, the spacing of the containers from one another in the first receiving unit is different from the spacing of the containers from one another in the second receiving unit. The handling apparatus can be used to change the spacing in this respect when the holding elements are transferred from the first relative position into the second relative position. As a result, a pitch of the containers in the first receiving unit can be adapted to the pitch of the containers in the second receiving unit, wherein the pitch adaptation is carried out by means of the handling apparatus.

The first receiving unit and/or the second receiving unit comprise or are, for example, a pharmaceutical packaging means, for example a common carrier for a plurality of containers, in particular a nest or a tray. It can accordingly be provided that the containers are removed from the packaging means or inserted into the packaging means. "Remove" and "insert" can be understood as "receive" or "transfer" in the above sense.

It may be provided, for example, that the first receiving unit and/or the second receiving unit comprise or are a transport device or a component of a transport device, in particular for the hanging and/or standing transportation of the containers. For example, a filling station, a weighing station, a closing station and/or a marking station as explained above are arranged along the transport device. The transport device can comprise a plurality of components, for example at least one cell chain or synchronization chain, at least one transport wheel and/or at least one linear transport system, wherein the cell chain can serve, for example, to transfer cyclically fed containers to continuously moved transport wheels. By means of the handling apparatus, containers are, for example, transferred from the common carrier with a first pitch to the transport device with a second pitch different therefrom. Alternatively or additionally, the containers can be transferred from the transport device with the pitch thereof to the carrier with a pitch different therefrom.

The adjusting device preferably is or comprises at least one pivot device for pivoting the handling apparatus about at least one pivot axis and/or at least one displacement device for displacing the handling apparatus along at least one axis. The handling apparatus is moved, for example, relative to a holding device of the processing system by means of the adjusting device. The holding device can, for example, be a frame or a substructure of the processing system on which the adjusting device is fixed. The displacement device can, for example, be a lifting device for raising and lowering the handling apparatus.

A control device is preferably provided to control drive units of the adjusting device.

The adjusting device can preferably comprise a plurality of segments that can be moved relative to one another and are pivotably and/or displaceably connected to one another by means of a respective articulation device.

In a preferred embodiment of the present disclosure, the adjusting device is or comprises a robotic device, in particular an articulated arm robot. The articulated arm robot (for example, a so-called Scara robot) is, for example, a horizontal articulated arm robot.

It can preferably be provided that, for example, a suction conduit and/or an electrical line of the handling apparatus is guided through the adjusting device.

The processing system preferably comprises a vacuum device to which is connected at least one suction conduit preferably guided through the adjusting device to the handling apparatus.

Alternatively or additionally, the processing system preferably comprises an electrical device to which is connected at least one electrical line preferably guided through the adjusting device to the spacing changing device.

The vacuum device and the adjusting device are, for example, arranged in a first zone which is formed by the holding device and spatially separated, and in particular pharmaceutically separated, from a second zone in which the handling apparatus is arranged and the containers are processed.

The processing system preferably comprises a transport device to which the containers can be transferred in the transfer position of the adjusting device, a filling station which is arranged at the transport device and by means of which a pharmaceutical substance can be filled into the containers, and at least one closing station, downstream thereof, for closing a container opening of the container with a closing element. This has already been discussed.

The processing system can advantageously comprise an additional handling apparatus and an additional adjusting device. The additional handling apparatus is preferably configured identically to the aforementioned handling apparatus. The same may apply to the additional adjusting device. In the receiving position of the additional handling apparatus, the containers can advantageously be received from the transport device by means of the holding elements of the additional handling apparatus assuming the first relative position, and in the transfer position of the additional handling apparatus, the containers can be transferred to a receiving unit from the holding elements of the additional handling apparatus assuming the second relative position.

This receiving unit is preferably that common carrier for the containers from which the containers have been received by the first handling apparatus for transfer to the transport device. The containers removed from the carrier can in this way be filled in the filling station, closed in the closing station, and subsequently reinserted into the carrier.

It is advantageous if the holding elements can be transferred from the first relative position into the second relative position during the transfer of the handling apparatus from the receiving position into the transfer position. In this way, the duration for processing the containers can be kept low and the cycle time can be increased. During the movement of the handling apparatus, the holding elements can be moved relative to one another and, in particular, a pitch adaptation can be carried out, in particular for changing the spacing of the pitch of the first receiving unit (for example, of a packaging means) to the pitch of the second receiving unit (for example, the transport device).

FIGS. 1 and 2 show an advantageous embodiment, which overall is denoted by reference numeral 10, of the processing system in accordance with the present disclosure for pharmaceutical containers at different times (hereinafter system 10). In the present exemplary embodiment, the system 10 makes it possible to remove pharmaceutical containers from a common carrier 12, also referred to as a "nest," to fill them with a pharmaceutical substance, to close them, and to subsequently insert them back into the carrier 12.

In FIGS. 9 to 12, the drawing shows, by way of example, containers 14 to be filled, which are configured as syringes 16. However, the system 10 is preferably also suitable for the alternative processing of vials, carpules and/or ampules. The present disclosure is not limited to the type of different containers 14—syringes, vials, carpules or ampules. Furthermore, the present disclosure makes it possible to process containers of the same type with different properties, for example of different sizes.

The mode of operation of the system 10 is first explained with reference to FIGS. 1 to 6.

The containers 14 fed via the carrier 12 in the arrow direction 18 can be received by means of a first handling apparatus 20 in a receiving position. The handling apparatus 20 is comprised by a first adjusting device 22 or is held thereon. The adjusting device 22 makes it possible to transfer the handling apparatus 20 from the receiving position into a transfer position. FIG. 1 shows the handling apparatus 20 with solid lines in the receiving position and with dotted lines in the transfer position; in FIG. 2, this is reversed.

In the transfer position of the handling apparatus 20, the received containers 14 can be transferred to a transport device 24 of the system 10. The transport device 24 can be configured in different ways and comprises, for example, a linear transport system, at least one transport wheel, and/or at least one cell chain (or synchronization chain).

The carriers 12 and the transport device 24 or the components thereof are receiving units for the containers 14.

In the present exemplary embodiment, the containers 14 are transferred in the transfer position to a cell chain 26 and from there via transport wheels 28 to a transport system 30.

The transport system 30 is a linear transport system on which a filling station 32 is arranged. In the filling station 32, the containers 14 can be filled with a pharmaceutical substance via a plurality of filling elements in the form of needles. Downstream of the filling station 32 in the transport direction 34, a weighing station 36 for checking the degree of filling follows the filling station 32 and, thereafter, a closing station 38 for closing a respective container opening with a closing element (not shown in the drawing). Depending on the type of container, the closing element may, for example, be a mushroom plug or a plunger.

The containers 14 are transferred from the transport system 30 via transport wheels 40 to a cell chain 42 of the transport device 24. The containers 14 can be received from the cell chain 42 with a second handling apparatus 44 in a receiving position. The second handling apparatus 44 is comprised by or held on a second adjusting device 46 of the system 10. With the adjusting device 46, the handling apparatus 44 can be moved from the receiving position into a transfer position. FIG. 1 shows the handling apparatus 44 with solid lines in the receiving position and with dotted lines in the transfer position; in FIG. 2, this is reversed.

In the transfer position, the containers 14 are transferred to the carrier 12 and reinserted thereinto. After initial removal of the containers 14, the carrier 12 is transported away by a transport device (not shown in the drawing) and transported past the transport device 24 into the end position (arrow 48) in order to receive the processed containers 14 again.

The carrier 12 is in particular a pharmaceutical packaging means.

Figures 3, 5, 6:
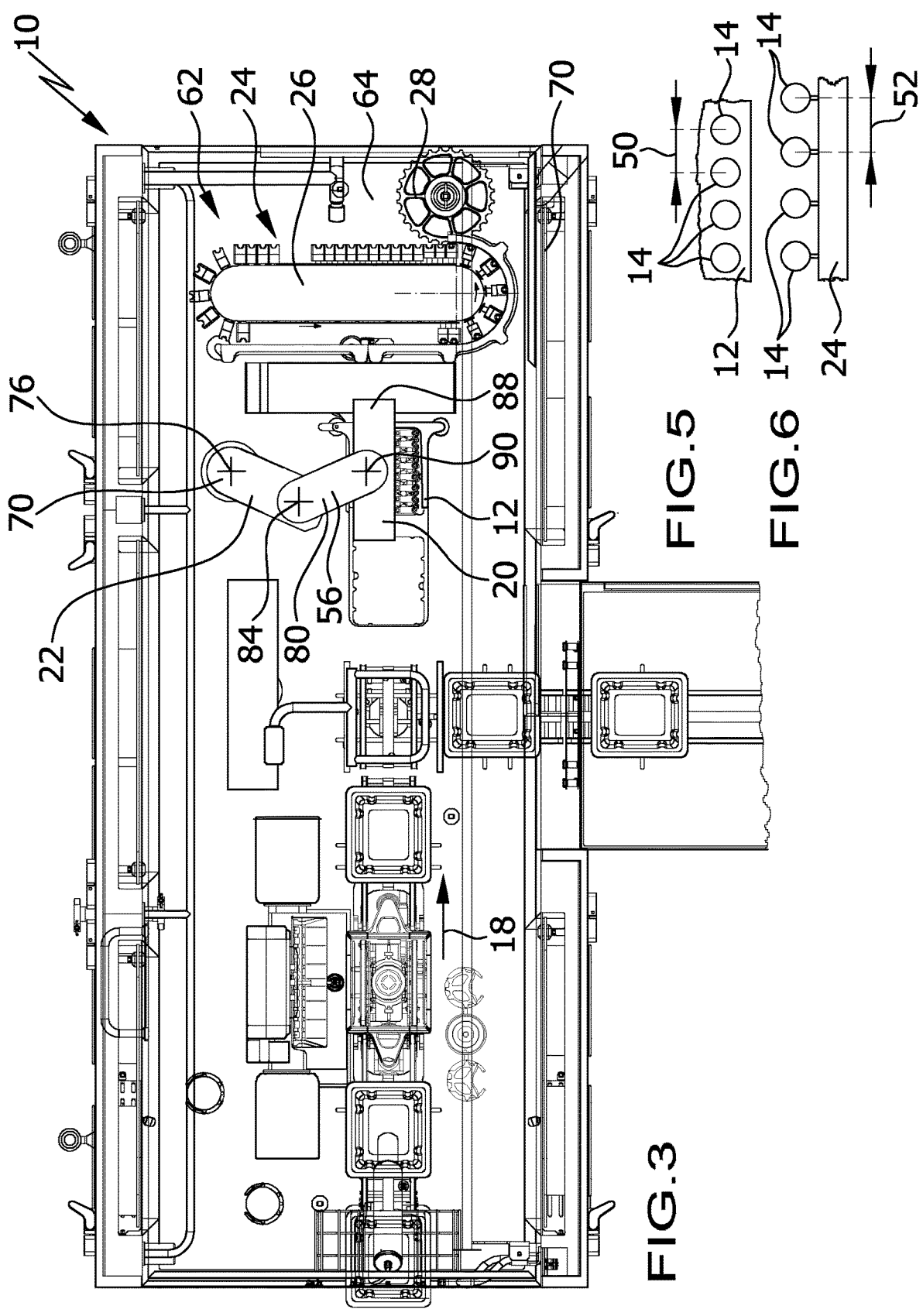
FIG. 3 is an enlarged view of portion A in FIG. 1 in a detail view.
FIG. 5 is a schematic of a plurality of pharmaceutical containers received in a common carrier.
FIG. 6 is a schematic of a plurality of pharmaceutical containers held on a transport device.

In the carrier 12, the containers 14 are usually arranged in a matrix-like manner and have preset spacings 50 from one another (FIG. 5). This spacing 50 depends on the carrier 12 used, whose dimensions and receptacles are adapted to the containers 14 to be received. The spacing 50 of adjacent containers 14 is also referred to as a "pitch," in the present case as a pitch of the carrier 12 or "nest pitch" if the carrier 12 is a nest.

In practice, it is common for the spacing of containers 14 to likewise be constant during the processing process in the system 10. FIG. 6 shows this schematically and by way of example for containers 14 which have a spacing 52 from one another. The spacing 52 is preset by the configuration of the system 10. In the present example, it is advantageous for the spacing 52 within the transport device 24 to be constant, starting from the cell chain 26 to the cell chain 42. This spacing is also referred to as a "pitch" of the system 10 on the transport device 24, in particular as a "machine pitch."

If the spacings 50 and 52 deviate from one another, it is necessary to change the relative spacing of the containers 14 that are removed from the carrier 12 such that the spacing 52 is preferably identical in the filling station 32, the weighing station 36, and the closing station 38, wherein it may, however, differ from the spacing 50. After processing the containers 14, it is conversely necessary to again change the spacing 52 of the containers 14 before the transfer back to the carrier 12 and to insert the containers 14 back into carrier 12 in the relative spacing 50.

The advantage in the present disclosure is that, by means of the handling apparatuses 20, 44 which are each an advantageous embodiment of the handling apparatus in accordance with the present disclosure, the spacing 50 of the containers 14 in the carrier 12 can be changed to the spacing 52 of the transport device 24, and vice versa. This makes it possible that, within the transport device 24, the machine pitch (spacing 52) can remain unchanged independently of the containers 14 to be processed and the nature of the carriers 12. A change from the spacing 50 to the spacing 52 during the transfer to the transport device 24 and a change from the spacing 52 to the spacing 50 during the reception from the transport device 24 can be carried out by the handling apparatuses 20, 44. This adaptation of the pitch of the carrier 12 to the machine pitch, and vice versa, is also referred to as a "pitch adaptation."

In particular, it is advantageous that in the present exemplary embodiment, the change of the distance 50 to the distance 52 can be carried out during the transfer of the handling apparatus 20 from the receiving position shown in a solid line in FIG. 1 into the transfer position shown in a solid line in FIG. 2. In a corresponding manner, it is favorable that the change of the distance 52 to the distance 50 can be carried out during the transfer of the handling apparatus 44 from the receiving position shown in a solid line in FIG. 1 into the transfer position shown in a solid line in FIG. 2. In this way, the cycle time of the system 10 can be kept low.

It is in particular favorable if the handling apparatuses 20, 44 and the adjusting devices 22, 46 are configured identically or at least functionally identically. In the present example, this is the case in the system 10. Only the configurations of the handling apparatus 20 and of the adjusting device 22 are therefore discussed below. The explanations in this respect apply in a corresponding manner to the handling apparatus 44 and the adjusting device 46.

In order to move the handling apparatus 20, the adjusting device 22 comprises at least one articulation device 54. The articulation device 54 can, for example, be a pivot device or a displacement device, in particular for a movement in a straight line. The displacement device can be a lifting device, for example.

It is conceivable, for example, that the adjusting device 22 for transferring the handling apparatus 20 from the receiving position into the transfer position can only be pivoted about an axis. Alternatively or additionally, for example, only a displacement of the handling apparatus may be provided. It is conceivable that a plurality of articulation devices 54 is provided as in the advantageous exemplary embodiment explained below.

Figures 4, 8:
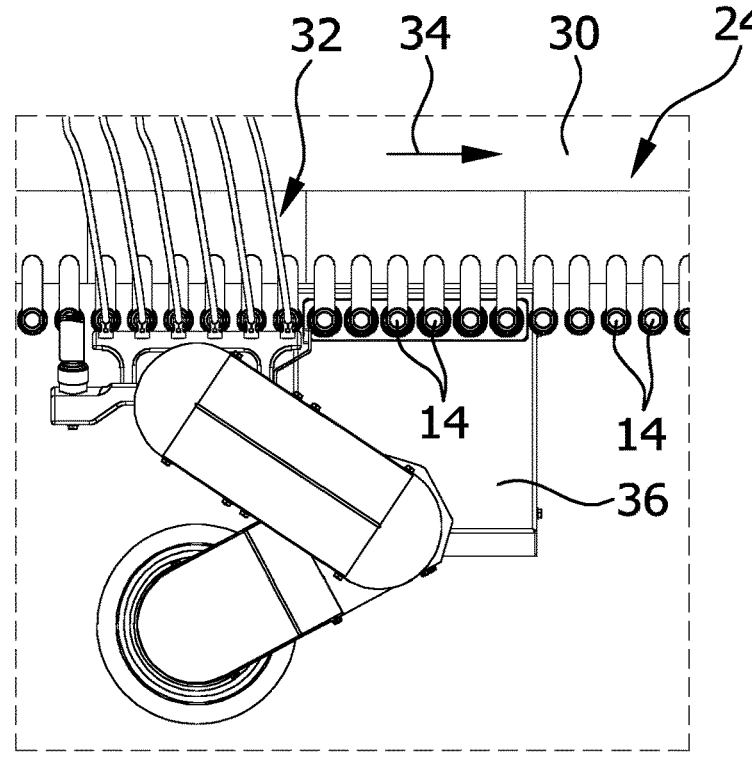
FIG. 4 is an enlarged view of portion B in FIG. 1 in a detail view.
FIG. 8 is an enlarged representation of detail C in FIG. 7.
Figure 7:
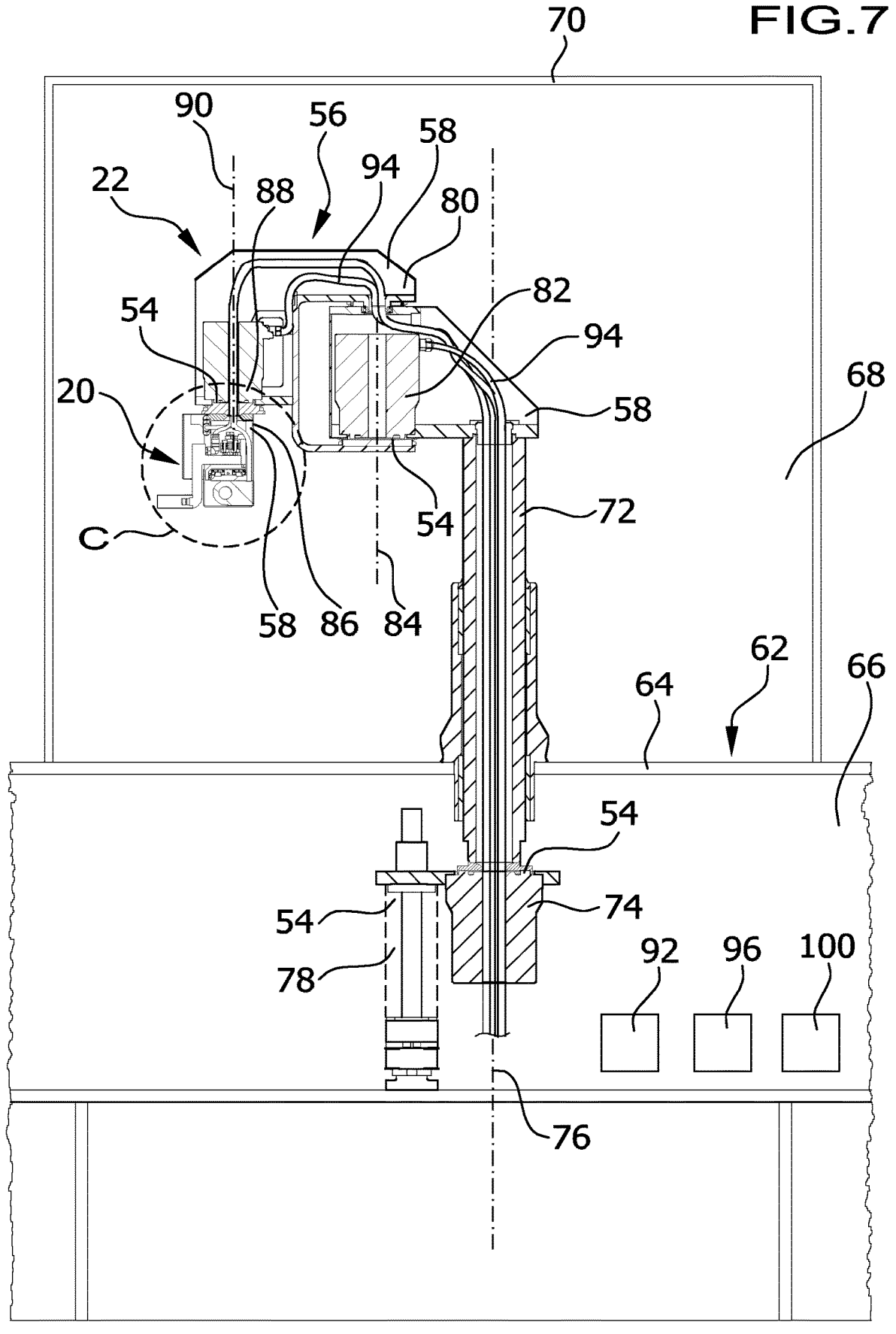
FIG. 7 is a schematic partial representation of the processing system of FIG. 1, partially cut, in which an adjusting device and a handling apparatus for holding pharmaceutical containers are shown.

As can be seen in particular in FIGS. 3, 7 and 8, the adjusting device 22 in the present case is a robotic device configured as an articulated arm robot 56, specifically as a horizontal articulated arm robot 56. This may in particular be a so-called Scara robot.

The robot 56 comprises a plurality of segments 58 which can be moved relative to one another and are connected to one another in an articulated manner via a respective articulation device 54.

The system 10 comprises at least one substructure 62 which can be designed as a frame, for example. The substructure 62 receives the components of the system 10 and forms a holding device for them.

A separating element 64 separates a first zone 66 from a second zone 68. The system 10 comprises at least one cover element 70, in the present case designed as a so-called isolator. The cover element 70 covers the second zone 68 and provides an atmosphere for protection and/or decontamination purposes, in particular via a protective gas, such as $H_2O_2$. The containers 14 are processed in the second zone 68 in which, in particular, the carriers 12, the handling apparatus 20, the transport device 24, the filling station 32, the weighing station 36 and the closing station 38 are arranged.

The first zone 66 is pharmaceutically separated from the second zone 68 by means of the separating element 64, which is, for example, plate-shaped.

A first segment 72 of the robot 56 passes through the separating element 64 and is arranged partially in the first zone 66 and partially in the second zone 68. A pivot device 74 enables a rotation of the first segment 72 relative to the separating element 64 about a pivot axis 76. A displacement device 78 enables an axial movement of the first segment 72 along the pivot axis 76.

The robot 56 comprises a second segment 80. The segments 72, 80 are connected to one another by an articulation device 54 in the form of a pivot device 82 so that they can pivot about a pivot axis 84.

The robot 56 also comprises a third segment 86. The segments 80, 86 are connected to one another via an articulation device 54 in the form of an additional pivot device 88 so that they can pivot about a pivot axis 90. In the present case, the third segment 86 is formed, for example, by the handling apparatus 20 so that it is held pivotably on the segment 80.

The pivot axes 76, 84, 90 are oriented in parallel to one another.

An electrical device 92 of the system 10 is arranged, for example, in the first zone 66. The electrical device 92 serves to supply energy and/or control the articulation devices 54 and the handling apparatus 20. Electrical lines 94 are preferably guided from the first zone 66 through the robot 56 which is preferably pharmaceutically sealed in the second zone 68. The lines 94 connect the handling apparatus 20 and the pivot devices 82, 88 to the electrical device 92.

A vacuum device 96 is also advantageously arranged in the first zone 66. The vacuum device 96 can be part of the system 10 or also only of the handling apparatus 20. A suction conduit 98 is guided through the robot 56 from the first zone 66 into the second zone 68 up to the handling apparatus 20. The suction conduit 98 can selectively be subjected to a negative pressure.

The system 10 preferably comprises a control device 100 with which the entire operation of the system 10 can be controlled. In particular, the electrical device 92 and the vacuum device 96 can be controlled.

Figure 9:
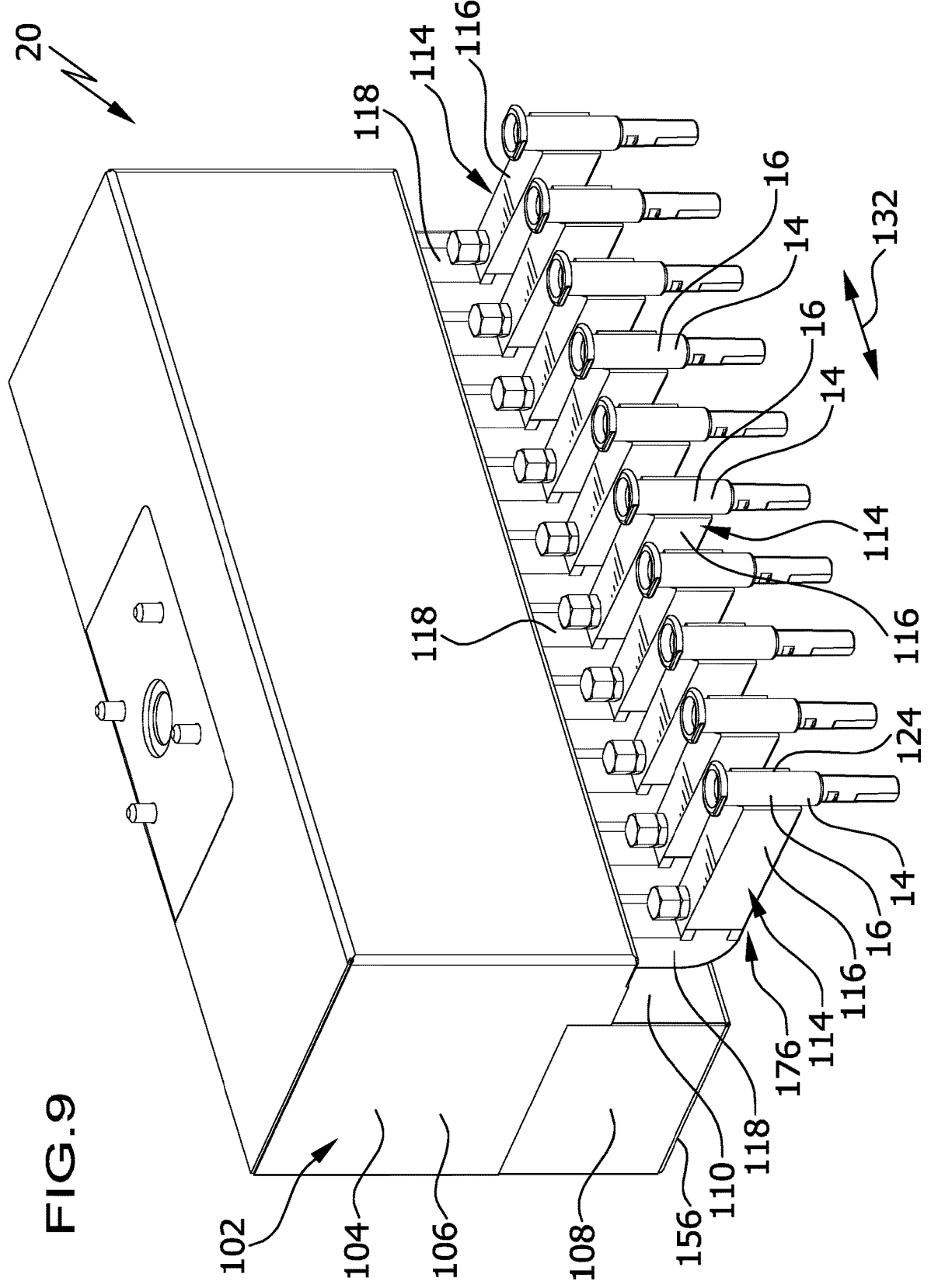
FIG. 9 is a perspective view of a handling apparatus in accordance with the present disclosure for pharmaceutical containers.

The handling apparatus 20 comprises a support device 102. In the present case, the support device 102 has a housing 104 by which the handling apparatus 20 is held on the second segment 80. The housing 104 is substantially configured cuboid and has a first portion 106 and a second portion 108. In one spatial direction, the second portion 108 is of a smaller dimension so that a cutout or a recess 110 is formed in the housing 104 (FIGS. 8 and 9).

In the housing 104, the support device 102 also comprises a frame 112 for holding additional components of the handling apparatus 20.

For gripping the containers 14, the handling apparatus 20 comprises a plurality of holding elements 114. The holding elements 114 are preferably configured identically.

A respective holding element 114 comprises a holding portion 116, a support portion 118 and a guide portion 120. A suction opening 122 is formed in a respective holding portion 116. The suction opening 122 is arranged at an edge of a cutout 124, the shape and/or size of which is adapted to the container 14. The container 14 engages in the cutout 124 such that the holding portion 116 rests against a jacket of the container 14.

The suction conduit 98 has a portion 126 which is guided through the robot 56. The portion 126 is connected to a connection element 128 and branches there into additional portions 130 of the suction conduit 98 (FIG. 8). A respective portion 130 extends through the holding element 114 and opens into the suction opening 122.

When the vacuum device 96 is activated, the suction opening 122 is subjected to a negative pressure. A respective container 14 can be gripped with the holding element 114 and is thereby arranged in the cutout 124 in contact with the holding portion 116. In this way, the containers 14 can be received by the carrier 12 or, in the case of the handling apparatus 44, can be received by the transport device 24.

If the vacuum device 96 is deactivated, there is no negative pressure at the suction opening 122. The containers 14 can be transferred to the transport device 24 or, in the case of the handling apparatus 44, can be transferred to the carrier 12.

The holding elements 114 are arranged laterally next to one another along a movement direction 132 and, in particular, are oriented in parallel to one another.

Figure 10:
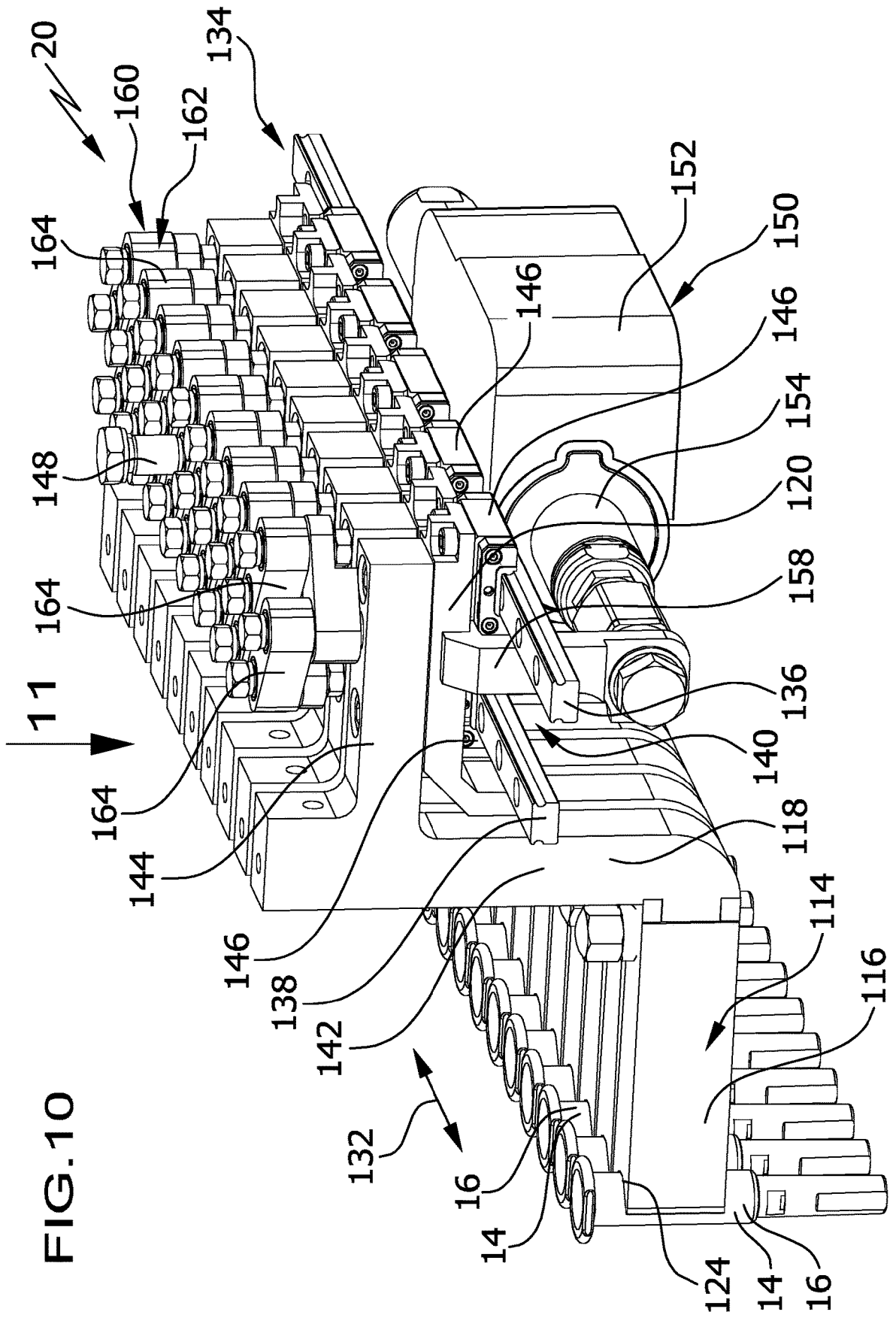
FIG. 10 is the handling apparatus of FIG. 9 in a perspective view without a housing.

A guide device 134 is arranged in the housing 104 and is held, for example, on the frame 112. The guide device 134 comprises guide elements 136, 138. The guide elements 136, 138 are configured as guide rails which each have a longitudinal extension in the movement direction 132. The guide elements 136, 138 are spaced apart from one another transversely to the longitudinal extension so that an intermediate space 140 is formed between them (FIG. 10).

As can be seen in particular in FIGS. 8 and 9, the support portion 118 of the holding element 114 projects from the housing 104 in the region of the recess 110. The holding portion 116 is arranged outside the housing 104.

The support portion 118 comprises a first segment 142 projecting from the housing 104 and a second segment 144 oriented at an angle relative thereto. The angle is, for example, substantially 90°. In the present case, the segment 144 is connected to the guide portion 120, in particular by a screw connection. Alternatively, the guide portion 120 can be integrally formed with the support portion 118.

A respective holding element 116 is displaceably guided on one of the guide elements 136. For this purpose, a bearing element 146 is provided which is connected to the guide portion 120 and comprises, for example, a ball bearing or a roller bearing. The use of a plain bearing is also conceivable. The bearing element 146 is connected, for example by a screw connection, to the guide portion 120, wherein a different connection is conceivable (FIG. 10).

Figure 11:
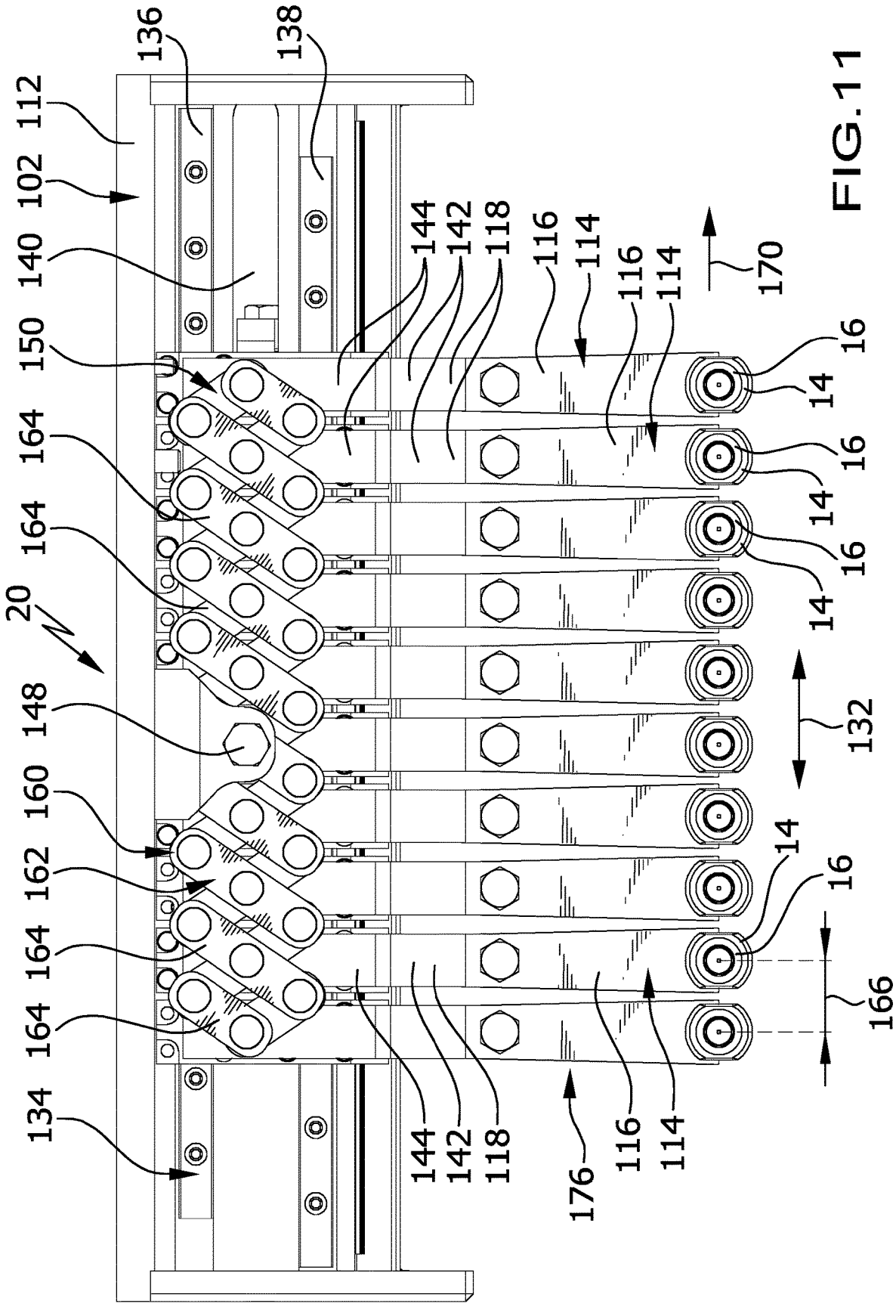
FIG. 11 is a plan view of the handling apparatus in the direction of the arrow "11" in FIG. 10, wherein holding elements of the handling apparatus assume a first relative position.

In the present case, each holding element 114 is mounted via the bearing element 146 on only one of the guide elements 136, 138. Adjacent holding elements 114 are mounted on different guide elements 136, 138. This offers the advantage that a compact design of the handling apparatus 20 can be achieved. In particular, the holding elements 114 can assume a closer state by being arranged closely next to one another (FIG. 11).

One of the holding elements 114 is held stationary on the support device 102. A fixing element 148 is used for this purpose. The relevant holding element 114 cannot be displaced along the movement direction 132. The remaining holding elements 114 can selectively be pushed back and forth along the movement direction 132 relative to one another and relative to the fixed holding element 114. In the present case, the fixed holding element 114 is one of the approximately centrally arranged holding elements 114, the fifth from the left in FIGS. 11 and 12. Alternatively, a different holding element 114 can be fixed, for example also one of the holding elements 114 arranged at the end.

In order to change the spacing of the holding elements 114 relative to one another, the handling apparatus 20 comprises a spacing changing device 150. The spacing changing device 150 comprises in particular a drive unit 152, in the present case an electric drive unit. The electrical line 94 serves to supply energy and control the drive unit 152 and, as mentioned, is guided through the robot 56 into the first zone 66. The control can take place by the electrical device 92, for example, as commanded by the control device 100.

In the present case, the drive unit 152 comprises a linear drive 154, for example with an electromagnetically controlled thrust shaft.

The drive unit 152 is received in the housing 104 and is positioned, for example, on a bottom wall 156.

Preferably, the drive unit 152 is arranged on the side of the guide elements 136, 138 opposite the guide portions 120. In this way, a compact design of the handling apparatus 20 can be achieved.

In particular, the drive unit 152 can be arranged below the guide elements 136, 138 and the guide portions 120.

"Below" and additional position and/or orientation information is to be understood in the present case as referring to an intended use of the handling apparatus 20 and of the system 10.

A thrust member 158 is arranged on the linear drive 154. The thrust member 158 projects through the intermediate space 140 and engages with one of the holding elements 114, for example on the guide portion 120 (FIG. 10).

If the drive unit 152 is activated, the relevant holding element 114 can be pushed in the movement direction 132. Both orientations are possible here. Depending on the operating state of the drive unit 152, the displacement can selectively be in one of the two orientations of the movement direction 132.

Apart from the drive unit 152, the spacing changing device 150 does not comprise any additional drive unit, which simplifies the structural configuration of the handling apparatus 20.

The spacing changing device 150 also comprises a coupling unit 160 by which the holding elements 114 are coupled to one another. The coupling unit 160 ensures that, when only one holding element 114 is driven by the drive unit 152, a relative movement of all holding elements 114 can be achieved with respect to a change in spacing. In this way, the movement of the driven holding element 114 is transmitted to the other holding elements 114, with the exception of the fixed holding element 114.

In the present case, the coupling unit 160 is or comprises a scissor lattice 162. The holding elements 114 are connected to one another via the scissor lattice 162. In this case, two articulation members 164, which intersect one another (FIGS. 11 and 12), are in each case articulated on a respective holding element 114. Each articulation member 164 is at the end articulated at opposite ends to two additional articulation members 164 of the scissor lattice 162. This holds true with the exception of the holding elements 114 arranged at the end, whose articulation members 164 are articulated at the end to only one additional articulation member 164 in each case.

The scissor lattice 162 comprises in particular a plurality of scissor joints connected in series with one another.

In the present case, articulation members 164 of the scissor lattice 162 are connected to one another by a screw connection, wherein a different connection is conceivable.

A compact design is achieved, for example, in that the scissor lattice 162 is arranged above the support portions 118, in particular of the segments 144. The scissor lattice 162 and the guide portions 120 are accordingly arranged on sides of the segments 144 facing away from one another.

The scissor lattice 162 can assume a pushed-together state (FIG. 11). In the pushed-together state of the scissor lattice 162, the holding elements 114 are closer to one another. Adjacent holding elements 114 have a spacing 166 from one another. The pushed-together state in which the holding elements 114 are close to one another defines, for example, a first relative position of the holding elements 114.

In the first relative position, the holding elements 114 are arranged in particular equidistantly from one another. The spacings 166 of respectively adjacent holding elements 114 are identical.

Figure 12:
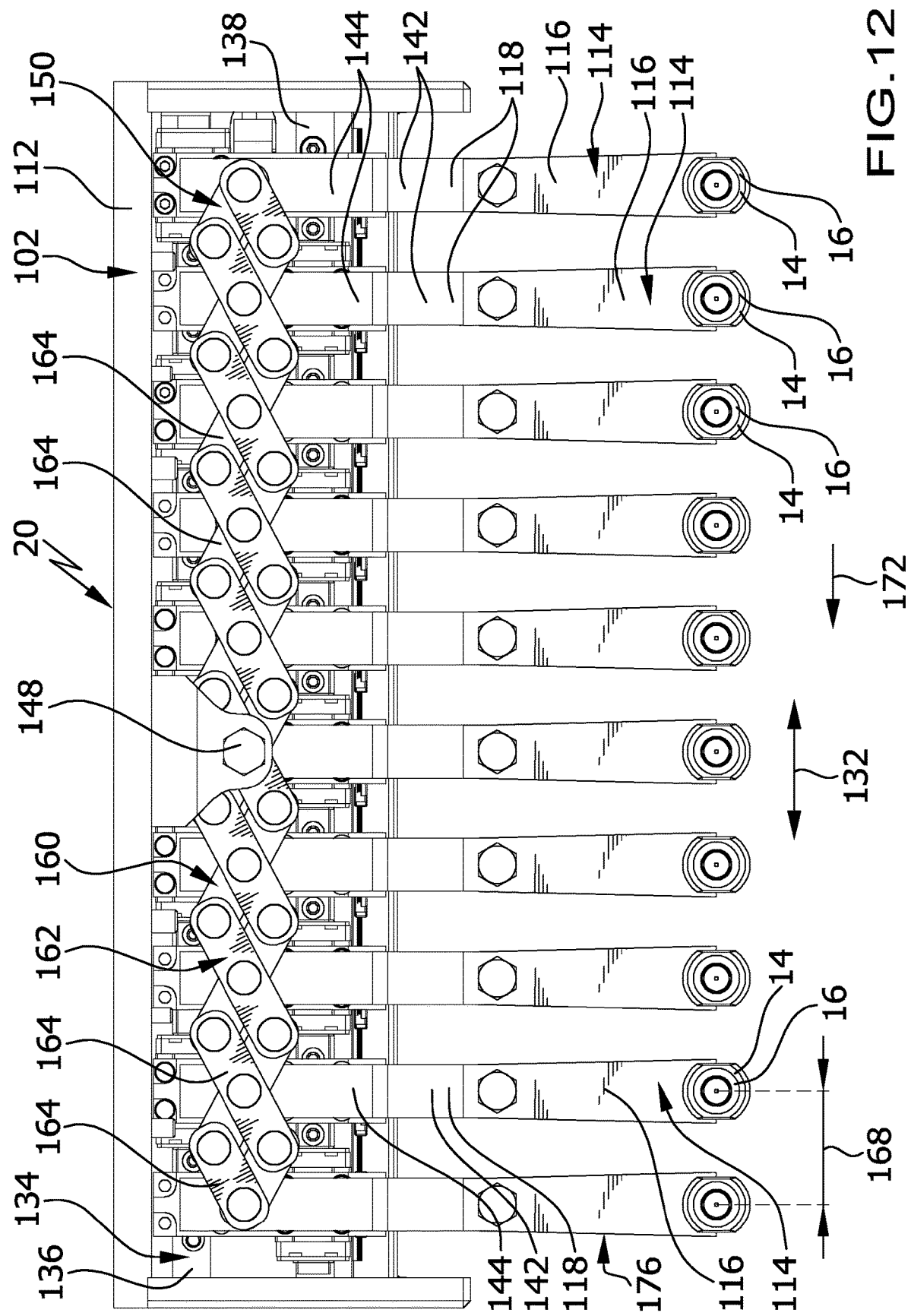
FIG. 12 is a representation corresponding to FIG. 11, wherein the holding elements assume a second relative position.

The scissor lattice 162 can assume a pulled-out state (FIG. 12). In the pulled-out state, the holding elements 114 are spread relative to one another and have a spacing 168 from one another. The spacing 168 differs from and is greater than the spacing 166. In particular, the pulled-out state of the scissor lattice 162 can define a second relative position of the holding elements 114. In the second relative position, the holding elements 114 are arranged equidistantly from one another. Respectively adjacent holding elements 114 have an identical spacing 168 from one another.

The transfer of the holding elements 114 from the first relative position into the second relative position, and vice versa, takes place in each case by a movement and in particular a displacement along the movement direction 132.

In order to trigger this movement, the drive unit 152 is activated. For example, the driven holding element 144 is displaced away from the nearest holding element 114 in order to transfer the holding elements 144 from the first relative position into the second relative position (arrow 170 in FIG. 11). In so doing, the holding elements 114 arranged on the right of the fixed holding element 114 in the drawing are displaced in the same direction. The holding elements 114 arranged on the left of the fixed holding element 114 are displaced in the opposite direction. All holding elements 114 are spread relative to one another.

Conversely, when they assume the second relative position, the driven holding element 114 can be displaced in the direction of the nearest holding element 114 (arrow 172 in FIG. 12). The holding elements 114 arranged on the right of the fixed holding element 114 in the drawing are displaced toward the latter. The holding elements 114 arranged on the left of the fixed holding element 114 in the drawing are displaced in the opposite direction. Overall, all holding elements 114 are moved closer to one another in order to reduce the spacing 166 to the spacing 168.

It is understood that depending on the control of the spacing changing device 150, it is possible to preset the spacing 166, 168 that the holding elements 114 assume in the first or second relative position. Accordingly, it is favorable if the first and/or the second relative position can be preset by means of the spacing changing device 150 depending on the containers 14 to be processed. In the system 10, however, as already mentioned, the machine pitch is constant over the transport device 24 and independently of the containers 14 to be processed. Accordingly, it is advantageous if the spacing 168 in the second relative position is maintained independently of the containers 14. In this case, the spacings 52 and 168 in particular correspond to one another.

The spacing 166 in the first relative position of the holding elements 114 can in particular be adapted to the pitch of the carrier 12 and correspond to the spacing 50.

It is understood that the size and the relationship of the spacings 50, 52, 166, 168 to one another in the present case merely serve to exemplarily illustrate the present disclosure and do not limit it. In particular, it can be provided that the spacing 166 in the first relative position is greater than the spacing 168 in the second relative position of the holding elements 114. In a corresponding manner, the spacing 52 can be greater than the spacing 50, in contrast to the representation in FIGS. 5 and 6.

In the system 10, the containers 14 are received with the holding elements 114 assuming the first relative position. The robot 56, which initially assumes the receiving position, moves the handling apparatus 20 into the transfer position. Meanwhile, the holding elements 114 are transferred into the second relative position in order to adjust the spacing 168 of the containers 14 to the machine pitch with the spacing 52.

The opposite applies to the handling apparatus 44. The holding elements 114 assume the first relative position, but in this case with a greater spacing 168 when the handling apparatus 44 assumes the receiving position. The robot 56 transfers the handling apparatus 44 into the transfer position. Meanwhile, the holding elements 114 are transferred into the second relative position, wherein in this case, the spacing of the containers 14 corresponds to the spacing 166. In this way, the machine pitch is adapted to the nest pitch of the carrier 12.

In FIGS. 9 to 12, the handling apparatus 20 in each case comprises, for example, ten holding elements 114. The detail drawing in accordance with FIG. 3 shows, by way of example, eight holding elements 114. However, this is solely due to the exemplary graphic representation, does not limit the present disclosure in any way, and does not lead to any contradiction.

FIG. 4 shows simultaneous processing of six containers 14 in the filling station 32 and in the weighing station 36. For this purpose, the number of containers 14 removed from the carrier 12 can, for example, be adapted by means of the cell chain 26 to the number of containers 14 which can be processed in these stations. This also does not limit the present disclosure in any way and does not lead to any contradiction.

The respective holding portion 116 is detachably connected to the support portion 118, in the present example by a screw connection. This makes it possible to exchange the holding portion 116 with a different holding portion 116 which is adapted to containers 14 of a different nature. The different containers 14 to be processed differ, for example, in terms of size and/or in terms of their type.

The system 10 can comprise in particular a format set 174 of holding elements 114 used, which are used in the representation in accordance with FIGS. 9 to 12. An additional format set 176 of different holding elements 114 can be provided (FIG. 1). A corresponding format set 176 may be provided for the handling apparatus 44 in addition to the format set 176 used.

It is understood that more than just two format sets 174, 176 can be provided.

The invention claimed is:

1. A processing system for pharmaceutical containers being vials, syringes, carpules and/or ampules and having a respective container opening and a jacket, the processing system, comprising at least one handling apparatus for the pharmaceutical containers and an adjusting device on which the handling apparatus is held or which comprises the handling apparatus, wherein the handling apparatus comprises two or more holding elements via which a container is grippable in each case and of which at least one holding element is selectively movable back and forth along a movement direction; and a spacing changing device for transferring the holding elements from a first relative position into a second relative position, and vice versa, in which the holding elements have a spacing from one another that differs from the spacing in the first relative position, wherein the respective holding elements are transferable, by means of at least one electrical actuating unit, between a holding position, in which the holding elements partially surround the container and hold it at the jacket by means of a positive engagement, and a release position, in which the containers are released and disengaged from the holding elements, wherein the adjusting device is designed to transfer the handling apparatus from a receiving position into a transfer position, and vice versa, wherein in the receiving position, the containers are receivable from a first receiving unit of the processing system by means of the holding elements assuming the first relative position, and are transferable, in the transfer position, to a second receiving unit of the processing system with the holding elements assuming the second relative position, wherein the first receiving unit is or comprises a pharmaceutical packaging material being a common carrier for a plurality of containers, namely a nest or a tray, and wherein the second receiving unit is or comprises a transport device or a component of a transport device, for the hanging or standing transportation of the containers.

2. The processing system in accordance with claim 1, wherein the at least one holding element is movable back and forth in a straight line along the movement direction.

3. The processing system in accordance with claim 1, wherein the handling apparatus comprises more than two holding elements which are arranged laterally next to one another along the movement direction and which are transferable by means of the spacing changing device from a first relative position into a second relative position, and vice versa, in which a spacing of respectively adjacent holding elements from one another is different from the spacing in the first relative position.

4. The processing system in accordance with claim 3, wherein the holding elements are arranged equidistantly from one another in at least one of the first relative position and the second relative position.

5. The processing system in accordance with claim 1, wherein one of the holding elements is fixed in place on a support device of the handling apparatus.

6. The processing system in accordance with claim 1, wherein the handling apparatus comprises a guide device with at least one guide element on which at least one holding element is displaceably guided along the movement direction.

7. The processing system in accordance with claim 6, wherein the guide device comprises two guide elements arranged spaced from one another, wherein in the case of more than two holding elements, a part of the holding elements is guided on a guide element and another part of the holding elements is guided on the additional guide element, and wherein adjacent holding elements are guided on different guide elements.

8. The processing system in accordance with claim 1, wherein the spacing changing device comprises an actuatable and/or controllable drive unit which is operatively connected to at least one holding element.

9. The processing system in accordance with claim 8, wherein the drive unit is configured to be electric.

10. The processing system in accordance with claim 8, wherein the handling apparatus comprises a coupling unit via which two or more holding elements are coupled to one another, wherein a movement of at least one holding element by means of the drive unit is transmitted via the coupling unit to at least one additional holding element.

11. The processing system in accordance with claim 10, wherein the coupling unit comprises or forms at least one scissor joint.

12. The processing system The handling apparatus in accordance with claim 11, wherein a scissor lattice is provided by which the two or more holding elements are connected to one another.

13. The processing system in accordance with claim 1, wherein, for subjecting a container to a negative pressure, a suction conduit with a suction opening is arranged on the respective holding element, wherein the suction conduit is connectable or is connected to a vacuum device.

14. The processing system in accordance with claim 1, wherein the handling apparatus comprises a housing in which the spacing changing device and a guide device for the holding elements are received and in which the holding elements are partially received, wherein a holding portion of a respective holding element is arranged outside the housing.

15. The processing system in accordance with claim 1, wherein the holding elements comprise a respective holding portion for gripping the containers and a respective support portion, wherein the holding portion is configured to be detachably connected to the support portion.

16. The processing system in accordance with claim 15, wherein the handling apparatus comprises a first format set of detachable holding portions and a second format set of detachable holding portions, wherein the format sets differ from one another by at least one container-specific characteristic.

17. The processing system in accordance with claim 1, wherein the adjusting device is or comprises at least one pivot device for pivoting the handling apparatus about at least one pivot axis and/or at least one displacement device for displacing the handling apparatus along at least one axis.

18. The processing system in accordance with claim 1, wherein the adjusting device is or comprises an articulated arm robot.

19. The processing system in accordance with claim 1, wherein the processing system comprises at least one of the following:

a vacuum device to which is connected at least one suction conduit, which is guided through the adjusting device to the handling apparatus;

an electrical device to which is connected at least one electrical line, which is guided through the adjusting device to the spacing changing device.

20. The processing system in accordance with claim 1, wherein the processing system comprises a filling station which is arranged at the transport device and by which a pharmaceutical substance is fillable into the containers, and at least one closing station, downstream thereof, for closing a container opening of the containers with a closure element.

21. The processing system in accordance with claim 20, wherein the processing system comprises further additional handling apparatus and an additional adjusting device, wherein in the receiving position of the further handling apparatus, the containers are received from the transport device by means of the holding elements of the further handling apparatus assuming the first relative position, and in the transfer position of the further handling apparatus, said containers are transferable to a receiving unit from the holding elements of the further handling apparatus assuming the second relative position.

22. The processing system in accordance with claim 21, wherein the receiving unit is the common carrier for the containers from which the containers have been received for transfer to the transport device.

23. The processing system in accordance with claim 1, wherein the holding elements are transferable from the first relative position into the second relative position during a transfer of the handling apparatus from the receiving position into the transfer position.

* * * * *